United States Patent
Ganti et al.

(10) Patent No.: US 11,551,143 B2
(45) Date of Patent: Jan. 10, 2023

(54) REINFORCEMENT LEARNING FOR CHATBOTS

(71) Applicant: International Business Machines Corporation, Armonk, NY (US)

(72) Inventors: Raghu Kiran Ganti, White Plains, NY (US); Mudhakar Srivatsa, White Plains, NY (US); Shreeranjani Srirangamsridharan, White Plains, NY (US); Yeon-sup Lim, White Plains, NY (US); Linsong Chu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 16/691,326

(22) Filed: Nov. 21, 2019

(65) Prior Publication Data

US 2021/0158203 A1    May 27, 2021

(51) Int. Cl.
*G06N 20/00*    (2019.01)
*H04L 51/02*    (2022.01)
(Continued)

(52) U.S. Cl.
CPC ........... *G06N 20/00* (2019.01); *G06F 8/60* (2013.01); *G06F 40/30* (2020.01); *G06N 3/006* (2013.01);
(Continued)

(58) Field of Classification Search
CPC .......... G06N 20/00; G06N 3/006; G06N 3/08; G06N 7/005; G06F 8/60; G06F 40/30;
(Continued)

(56) References Cited

U.S. PATENT DOCUMENTS

| 7,783,486 B2 | 8/2010 | Rosser et al. |
| 2012/0047103 A1* | 2/2012 | Marecki ............. H04L 63/1416 709/224 |

(Continued)

FOREIGN PATENT DOCUMENTS

| KR | 101851793 B1 | 4/2018 |
| WO | 2018227462 A1 | 12/2018 |
| WO | 2019032994 A1 | 2/2019 |

OTHER PUBLICATIONS

Serban et al., A Deep Reinforcement Learning Chatbot, Nov. 5, 2017, Montreal Institute for Learning Algorithms, Montreal, Quebec, Canada, arXiv:1709.02349v2 [cs.CL], 40 Pages. (Year: 2017).*

(Continued)

*Primary Examiner* — Austin J Moreau
*Assistant Examiner* — Chhian (Amy) Ling
(74) *Attorney, Agent, or Firm* — Daniel M. Yeates

(57) ABSTRACT

A computer-implemented method for generating and deploying a reinforced learning model to train a chatbot. The method includes selecting a plurality of conversations, wherein each conversation includes an agent and a user. The method includes identifying, in each of the conversations, a set of turns and on or more topics. The method further includes associating one or more topics to each turn of the set of turns. The method includes, generating a conversation flow for each conversation, wherein the conversation flow identifies a sequence of the topics. The method includes applying an outcome score to each conversation. The method includes creating a reinforced learning (RL) model, wherein the RL model includes a Markov is based on the conversation flow of each conversation and the outcome score of each conversation. The method includes deploying the RL model, wherein the deploying includes sending the RL model to a chatbot.

17 Claims, 6 Drawing Sheets

(51) Int. Cl.
*G06N 7/00* (2006.01)
*G06F 8/60* (2018.01)
*G06N 3/00* (2006.01)
*G06N 3/08* (2006.01)
*G06F 40/30* (2020.01)
*G06Q 10/06* (2012.01)

(52) U.S. Cl.
CPC ............... G06N 3/08 (2013.01); G06N 7/005 (2013.01); G06Q 10/06316 (2013.01); H04L 51/02 (2013.01); *G05B 2219/32334* (2013.01); *G05B 2219/33056* (2013.01)

(58) Field of Classification Search
CPC .... G06Q 10/06316; G05B 2219/32334; G05B 2219/33056; H04L 51/02
See application file for complete search history.

(56) References Cited

U.S. PATENT DOCUMENTS

| | | | |
|---|---|---|---|
| 2014/0297268 A1* | 10/2014 | Govrin | G06N 5/04 704/9 |
| 2015/0286819 A1* | 10/2015 | Coden | G06F 21/554 726/23 |
| 2018/0053119 A1 | 2/2018 | Zeng et al. | |
| 2018/0082213 A1 | 3/2018 | McCord | |
| 2018/0121766 A1* | 5/2018 | McCord | G06N 3/08 |
| 2018/0131645 A1* | 5/2018 | Magliozzi | G06F 40/30 |
| 2018/0218080 A1* | 8/2018 | Krishnamurthy | G06F 16/90332 |
| 2018/0316791 A1* | 11/2018 | Cai | G06N 3/006 |
| 2019/0158433 A1* | 5/2019 | Yun | G10L 15/063 |
| 2021/0004647 A1* | 1/2021 | Amirloo Abolfathi | G05D 1/0088 |
| 2021/0012288 A1* | 1/2021 | Mroczka | G06Q 10/06375 |

OTHER PUBLICATIONS

Disclosed Anonymously, "Conversational Platform for Developing and Executing Mood-Based Adaptive Chatbots," IP.com Prior Art Database Technical Disclosure, IP.com No. IPCOM000251074D, Oct. 9, 2017, 3 pgs.

Serban et al., "Building End-to-End Dialogue Systems Using Generative hierarchical Neural Network Models," arXiv:1507.04808v3, Apr. 6, 2016, 8 pages, Cornell University.

Mohammed et al., "Machine Learning: Algorithms and Applications," CRC Press, Jul. 18, 2016, 2 pgs.

Mell et al., "The NIST Definition of Cloud Computing", Recommendations of the National Institute of Standards and Technology, Sep. 2011, U.S. Department of Commerce, Special Publication 800-145, 7 pages.

* cited by examiner

REINFORCEMENT LEARNING FOR CHATBOTS

BACKGROUND

The present disclosure relates to chatbots, and, more specifically, building reinforcement learning models for training chatbots.

Chatbots are becoming being increasingly deployed to handle two party communications. Chatbots are used in both a voice setting and online chat services. However, chatbots cannot handle all situations that arise with customers. For example, a chatbot may misunderstand a purpose for the communication, or the customer may have several questions, and the chatbot may only be able to understand one of the questions. These misunderstandings may cause users to become upset, request a human operator, or even result in a loss of customers, among other detrimental effects. Some current systems manually create large databases of if/then statements to respond to user requests. However, this method can be rigid, and not necessarily configured to provide the best outcomes.

There is a need to develop a chatbot system that can identify and understand various concerns/issues of a user and develop a logical sequence to resolve each issue. Additionally, such a chatbot system may also analyze previous conversations and determine, based on the outcomes of the previous conversations, sequences and responses to have the highest probability of positive outcomes for the user.

SUMMARY

Disclosed is a computer-implemented method for generating and deploying a reinforced learning model to train chatbot. The method includes selecting a plurality of conversations, wherein each conversation includes an agent and a user. The method also includes identifying, in each of the plurality of conversations, a set of turns and on one or more topics. The method further includes associating one or more topics to each turn of the set of turns. The method includes, generating, based on the set of turns, a conversation flow for each conversation, wherein the conversation flow identifies a sequence of the one or more topics. The method further includes applying an outcome score to each conversation. The method also includes creating a reinforced learning (RL) model, wherein the RL model includes a Markov chain and wherein the RL model is based on the conversation flow of each conversation and the outcome score of each conversation. The method includes deploying the RL model, wherein the deploying includes sending the RL model to a chatbot. The above method can lead to improved conversations between a user and a chatbot, increasing the likelihood the conversation will have a good outcome.

Also disclosed is the above method further including initiating, by the chatbot, a new conversation. The method also includes developing, based on the RL model and based on a set of topics in the new conversation, a new conversation sequence. The method includes completing, by the chatbot, one or more tasks, wherein the one or more tasks are based on the set of topics in the new conversation. This embodiment may generate a sequence to provide a better experience for the user.

Further embodiments of the above method include determining, based on the RL model, that a probability of a positive outcome falls below a threshold, and transferring, in response to the probability falling below the threshold, the new conversation to a human agent. This embodiment further prevents negative outcome by preventing using a human operator to handle low likelihood of success situations.

Further embodiments of the above method include, updating, in response to the probability falling below the threshold, the RL model, wherein the update alters the new conversation sequence and is configured to prevent the probability from falling below the threshold. These embodiments recognize a low chance of success and alter the model to lower the chance a similar situation reoccurs.

Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
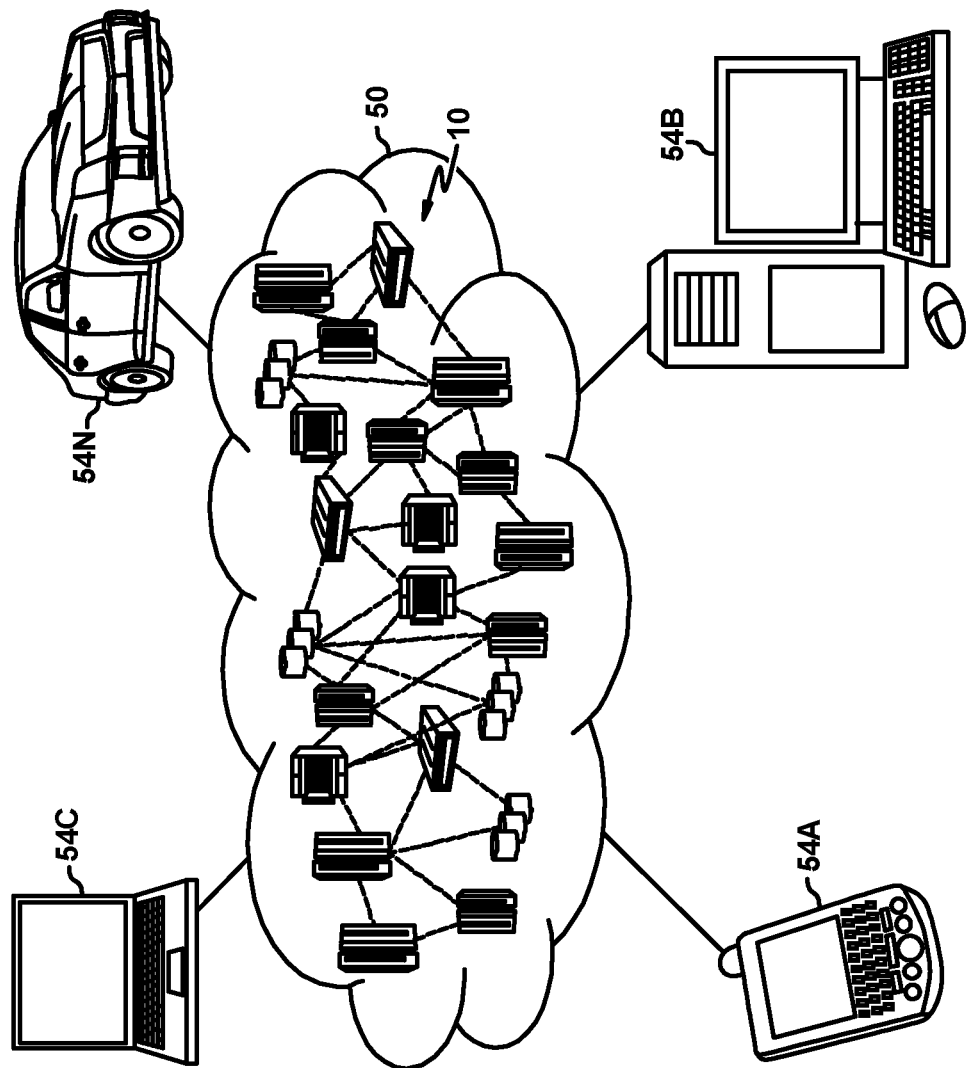
FIG. 1 depicts a cloud computing environment according to an embodiment of the present invention.

In order to better utilize chatbots in addressing user concerns, a reinforcement learning network may be utilized to identify issues and follow a logical sequence in resolving each issue. The learning model may utilize a plurality of previous user agent (chatbot or human) conversation. Based on the outcome of the existing conversations a chatbot (e.g., agent, decision maker) may be rewarded when choosing actions (e.g., sequences) that will provide the greatest satisfaction to the user.

The following acronyms may be used below:
API application program interface
ARM advanced RISC machine
CD-ROM compact disc ROM CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
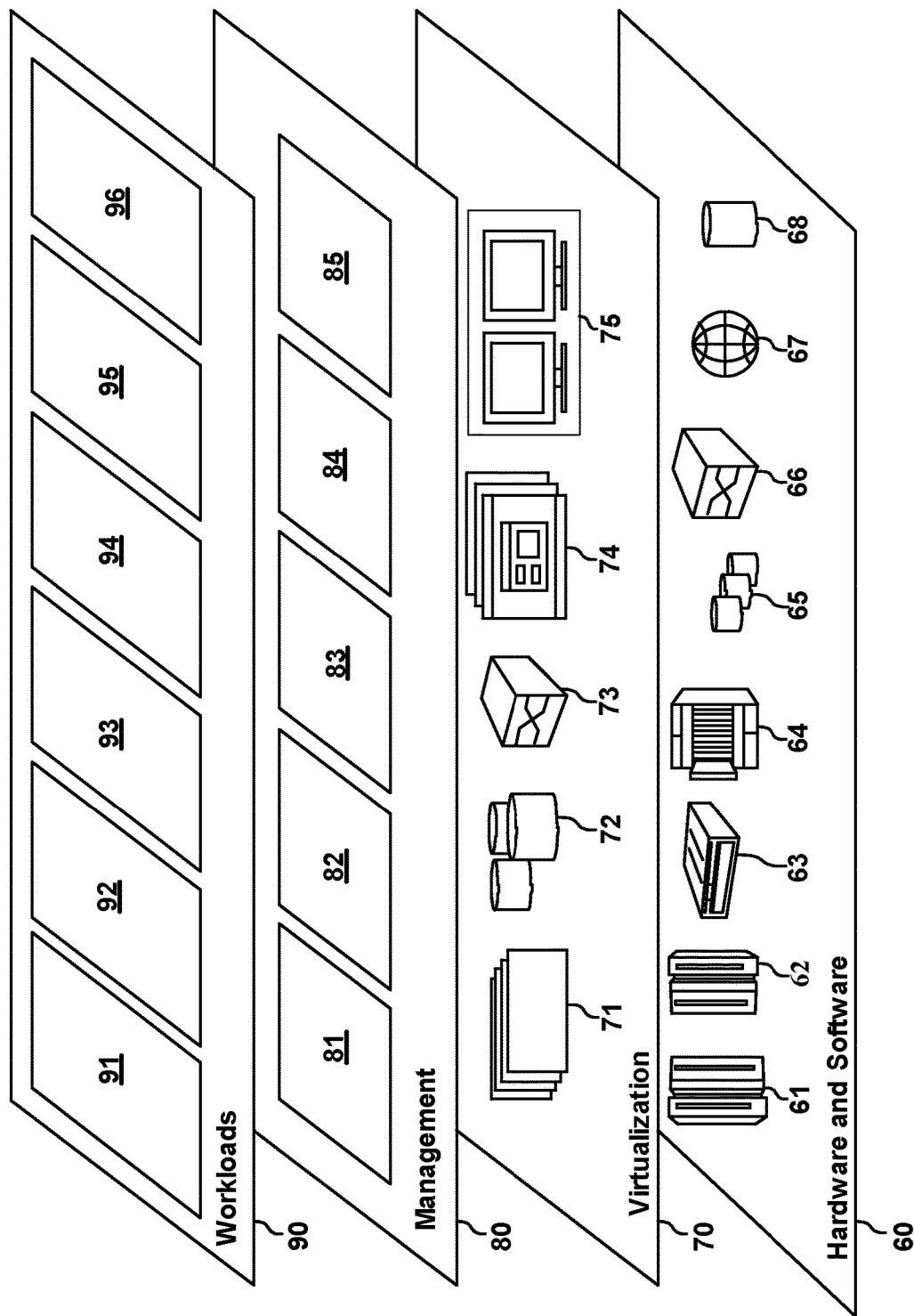
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
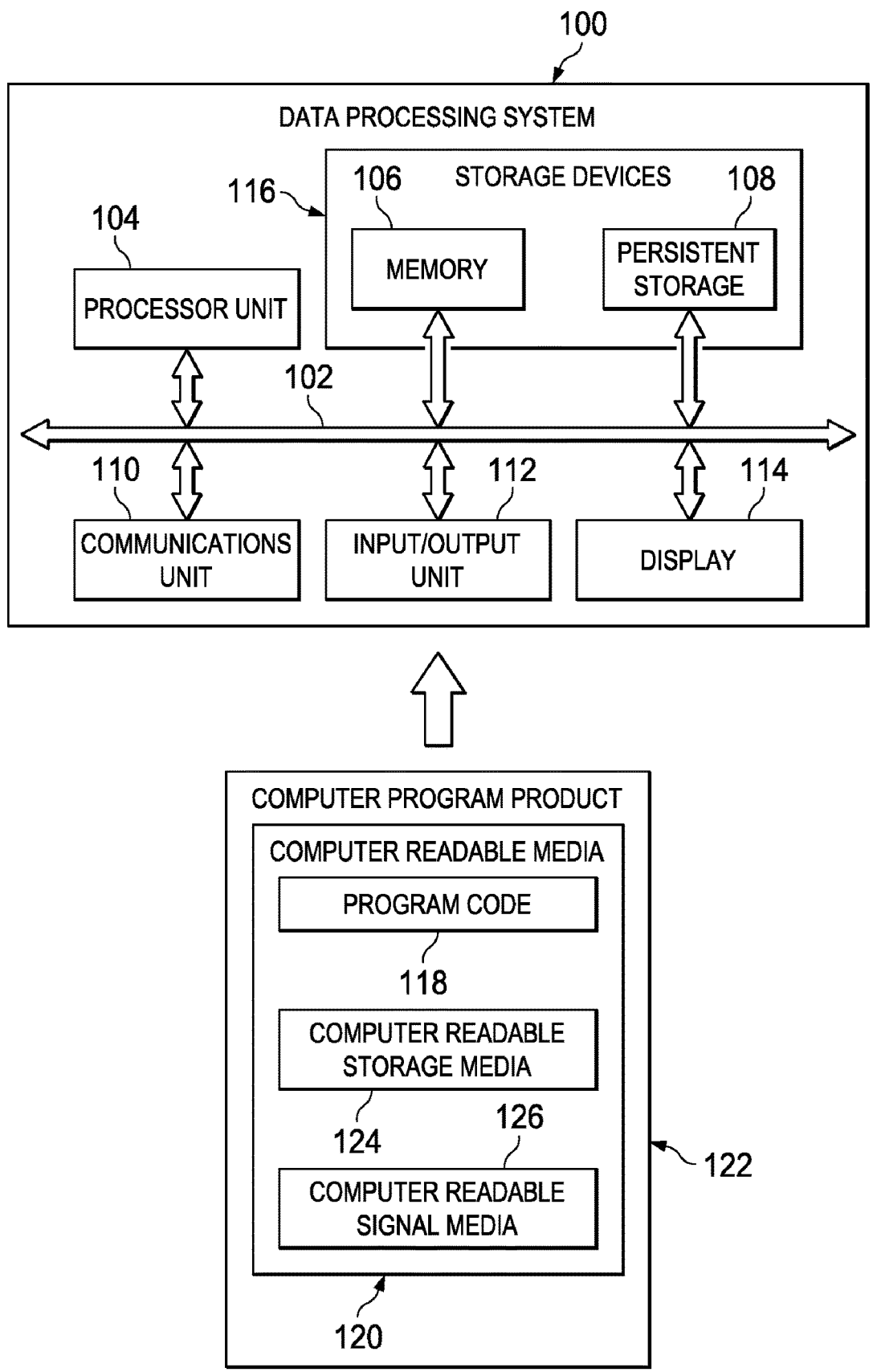
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Chatbot System

A reinforced learning (RL) network is a type of neural network (or artificial intelligence, machine learning, etc.) that is designed to maximize the total cumulative reward for a decision maker or agent. The agent may be trained by receiving a reward in response to each decision. The reward may include positive reinforcement or negative reinforcement.

A Markov chain is a system that predicts future actions based on a current state. It uses probabilities to predict outcomes of a current event. The probability of each future event is fixed regardless of the path to the current state. Markov chain's may be utilized in RL networks.

Embodiments of the present disclosure generate and implement one or more RL models for chatbot systems. A chatbot may be any computer system that is configured to communicate with a human user. In some embodiments, the chatbot uses natural language processing and/or voice recognition to interpret input received from the user, and then responds based on the inputs from the user.

In some embodiments, the RL model is generated by analyzing a plurality of conversations. Each conversation may be between an agent (human or chatbot) and a user. Each conversation is divided into a plurality of turns, and includes one or more topics (questions, queries, issues, concerns, inquiries, etc.). A turn includes utterances by one party before the other party communicates. Each time a different party speaks, it may be a new turn. A topic can be a reason for the communication, or a goal the user intends to accomplish. Some example topics include, making a purchase, an informational inquiry (e.g., account status, etc.), opening accounts, closing accounts, complaints, and other similar topics.

In some embodiments, generating one or more RL models includes mapping each conversation into a sequence of topics. The sequence may be based on the order in which the topics/issues were discussed.

In some embodiments, each turn/topic/sequence is scored. The score may act as positive or negative reinforcement. If the actions associated with each turn increase the likelihood of a positive outcome (e.g., satisfied customer, product sale, etc.) then it will be scored positively. If the action associated with the turn decreases the likelihood of a positive outcome, then it will be scored negatively. The scoring may be based on user feedback, on an admin determination, on the final result, and/or other similar factors.

In some embodiments, generating RL models includes forming a Markov chain generated based on the corpora of conversations analyzed. In some embodiments, the Markov chain is related to the transition between topics. In some embodiments, the Markov chain is related to the actions within a topic. In some embodiments, the Markov chain assists in determining a subsequent action (e.g., topic transition, etc.) for the chatbot. The determination may be based on probabilities of a positive outcome based on the current state of the conversation.

In some embodiments, a unique RL model is generated for each topic within the conversations. The method described below for sequencing topics may be used within a topic to assist in accurately completing a task associated with the topic.

In some embodiments, the RL models are deployed within the chatbot. In some embodiments, the RL models may assist an agent in responding to user requests and/or concerns. The agent may be a human agent or a chatbot. For example, if the agent is a human agent, the RL model may assist in determining the order in which to discuss topics, additional topics that may be discussed even if the user doesn't request discussion of these topics, what topic to transition to, when to transition between topics, when (and if) to transfer user to a different agent (e.g., accounting to sales), and other similar scenarios. If the agent is a chatbot, then the RL model may assist in generating automated responses to the user, as well as all the functions of assisting the human agent. In some embodiments the RL model instructs the chatbot to transfer the user to a human agent. This may be in response a probability of a positive outcome falling below a threshold. The chatbot may record the state and update the RL models to reduce a likelihood of a similar situation occurring in the future.

In some embodiments, the RL model can identify anomalous conversations. An anomalous conversation is a conversation that is atypical and/or uncommon. Anomalous conversations may be marked and/or ignored to not disrupt the RL model.

The aforementioned advantages are example advantages, and embodiments exist that can contain all, some, or none of the aforementioned advantages while remaining within the spirit and scope of the present disclosure.

Figure 4:
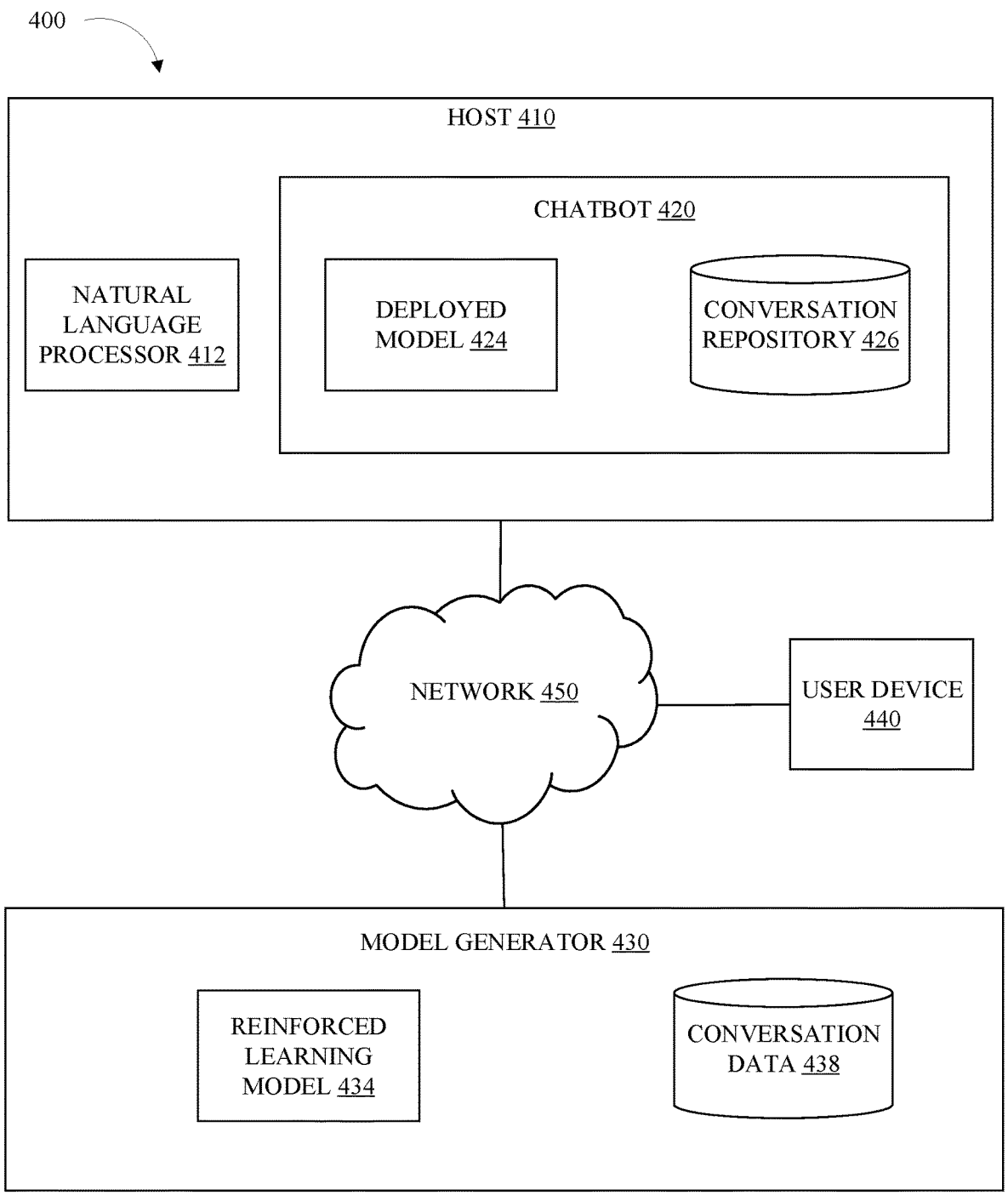
FIG. 4 illustrates a functional diagram of a computing environment suitable for operation of model generator, in accordance with some embodiments of the present disclosure.

Referring now to various embodiments of the disclosure in more detail, FIG. 4 is a representation of a computing environment 400, that is capable of running an RL model generator in accordance with one or more embodiments of the present disclosure. Many modifications to the depicted environment may be made by those skilled in the art without departing from the scope of the disclosure.

Computing environment 400 includes host 410, model generator 430, user device 440, and network 450. Network 450 can be, for example, a telecommunications network, a local area network (LAN), a wide area network (WAN), such as the Internet, or a combination of the three, and can include wired, wireless, or fiber optic connections. Network 450 may include one or more wired and/or wireless networks that are capable of receiving and transmitting data, voice, and/or video signals, including multimedia signals that include voice, data, and video information. In general, network 450 may be any combination of connections and protocols that will support communications between host 410, model generator 430, user device 440, and other computing devices (not shown) within computing environment 400. In some embodiments, host 410, model generator 430, and user device 440 may include a computer system, such as the data processing system 100 of FIG. 3.

Host 410 can be a standalone computing device, a management server, a web server, a mobile computing device, or any other electronic device or computing system capable of receiving, sending, and processing data. In other embodiments, host 410 can represent a server computing system utilizing multiple computers as a server system, such as in a cloud computing environment like, for example, cloud computing environment 50. In some embodiments, host 410 represents a computing system utilizing clustered computers and components (e.g., database server computers, application server computers, etc.) that act as a single pool of seamless resources when accessed within computing environment 400. In some embodiments host 410 includes chatbot 420, and natural language processor (NLP 412)

NLP 412 can be any combination of hardware and/or software configured to convert input from a user into machine readable code. In some embodiments, NLP receives utterances from the user. NLP 412 may identify key words and/or phrases. In some embodiments, NLP 412 identifies one or more intents for the utterances.

Chatbot 420 can be any combination of hardware and/or software configured to interact with a user (or customer). In some embodiments, the interaction may occur in real time. As used herein, interactions with the chatbot 420 occurring in real time may include interactions during which the chatbot 420 and a user interact rapidly enough (e.g., with little enough pause between responses) such that the interaction is indistinguishable from having a conversation with a human (and least in terms of considering response time). In some embodiments, chatbot 420 is a messaging system (e.g., chat, email, etc.). In some embodiments, chatbot 420 is a telephone system.

In some embodiments, chatbot 420 includes deployed model 424 and conversation repository 426. Deployed model 424 can include a reinforced learning model configured to respond to and/or resolve user requests. In some embodiments, deployed model 424 is consistent with RL model 436. In some embodiments, deployed model 424 is a copy of RL model 434. The copy may be sent to chatbot 420 in response to RL model 434 being updated (or retrained). The updating may be based on new conversations and/or negative outcomes of conversations.

Conversation repository 426 can be any combination of hardware and/or software that can store conversation transcripts for an extended period of time. The period of time may be an absolute period (e.g., forever, 5 years), a relative period of time (relative to some event), or event-driven, (e.g., a time it takes for a particular number of responses in a first in first out method). In some embodiments, conversation repository 426 includes a record of all conversions performed by chatbot 420.

Model generator 430 can be any configuration of hardware and/or software configured to generate RL models. In some embodiments, RL models are generated in response to analyzing a corpora of agent user conversations. In some embodiments, the RL models are configured to select actions in an environment to obtain the highest amount of positive feedback. In some embodiments, the positive feedback is based on outcome score.

In some embodiments, model generator 430 includes RL model 434 and conversation data 438. RL model 434 can be a neural network configured to produce a positive outcome. The positive outcome may be linked to the user accomplishing goals associated with the conversation. In some embodiments, RL model 434 includes a plurality of models. For example, there can be a model for an entire conversation, and a model for each topic within a conversation.

In some embodiments, each model includes a Markov chain. The Markov chains may have one or more potential outcomes (or destinations) based on a current state. Each destination is associated with a probability, wherein all the probabilities add up to one for each state.

In some embodiments, RL model 434 is updated. The updates may be based on additional/newly analyzed conversations. In some embodiments, the update is based on deployed model 424 generating a negative outcome for overall conversation and/or a topic. In some embodiments, the negative outcome may be transferring a user to a human agent. In some embodiments, the negative outcome may be the user providing negative feedback.

Conversation data 438 can be any combination of hardware and/or software that can store conversation data for an extended period of time. Conversation data may include conversation transcripts that have been analyzed. For example, assume a first conversation was received from conversation repository 426 and analyzed. The first conversation would be categorized by turns, topics, sequence, and/or other relevant categories. In some embodiments, the analyzed conversation includes outcome scores. The outcome scores may be based on an external input. The external input may be received from the user via a feedback system. The external input may be received from a subject matter expert (SME). In some embodiments, the SME reviews the analyzed conversation and manually assigns outcome scores. The outcome score may be binary (e.g. positive or negative), or a numeric value (e.g., one through five). In some embodiments, each conversation includes a plurality of outcome scores. There may be an outcome score for each turn, each topic, and/or each conversation.

User device 440 can be of any of a number of different data processing systems, such as the data processing system 100, including client computing devices, server computing devices, a tablet computer, laptop computer, telephone or other communication device, a personal digital assistant (PDA), or the like. In some illustrative examples, user device 440 may be a portable computing device that is configured with flash memory to provide non-volatile memory for storing operating system files and/or user-generated data. In various embodiments, user device 440 includes software, hardware, and other components to communicate, via network 450, to model generator 430, host 410, and/or chatbot 420.

Figure 5:
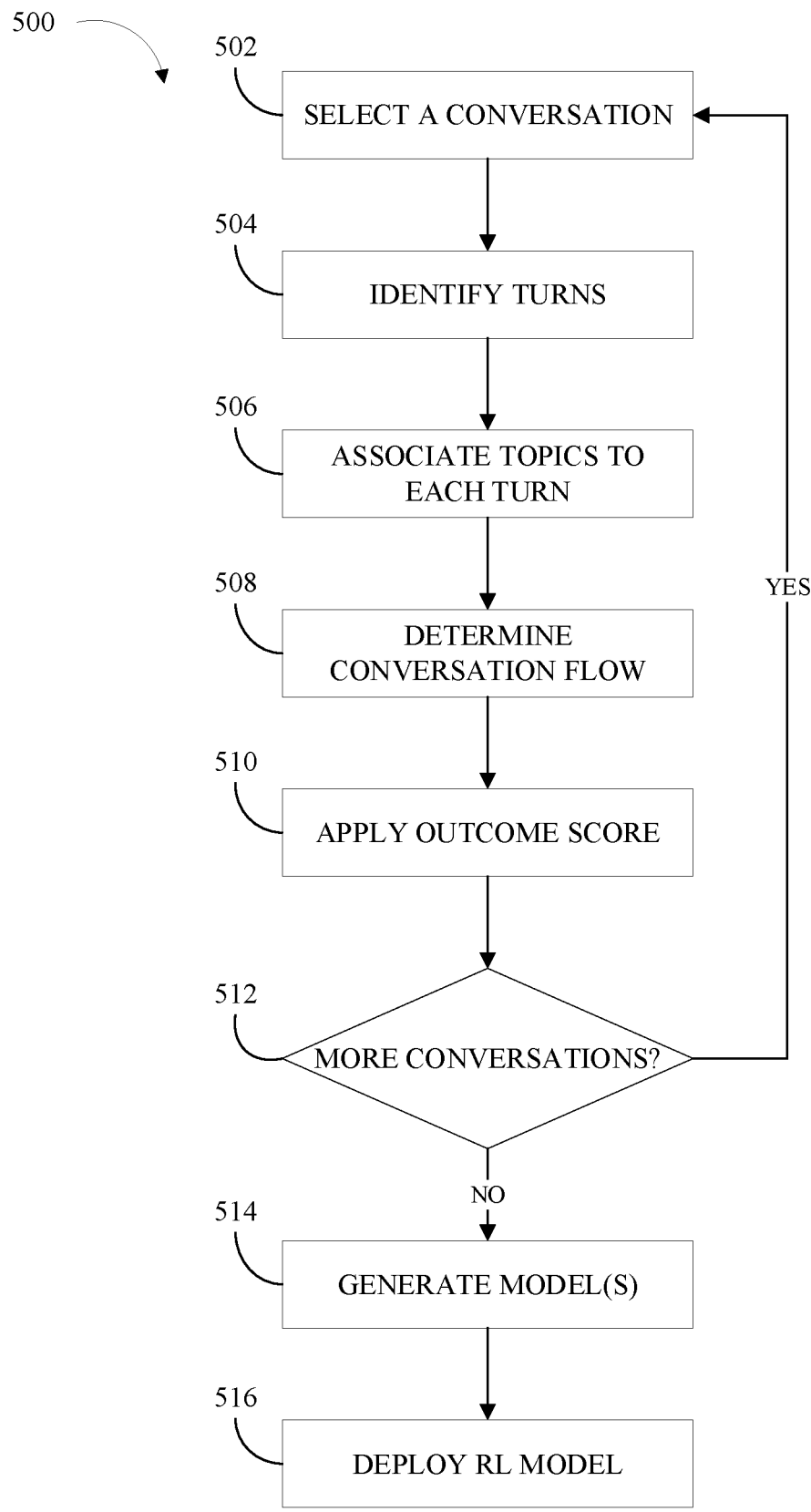
FIG. 5 illustrates a flow chart of an example method to generate a reinforced learning model, in accordance with some embodiments of the present disclosure.
Figure 6:
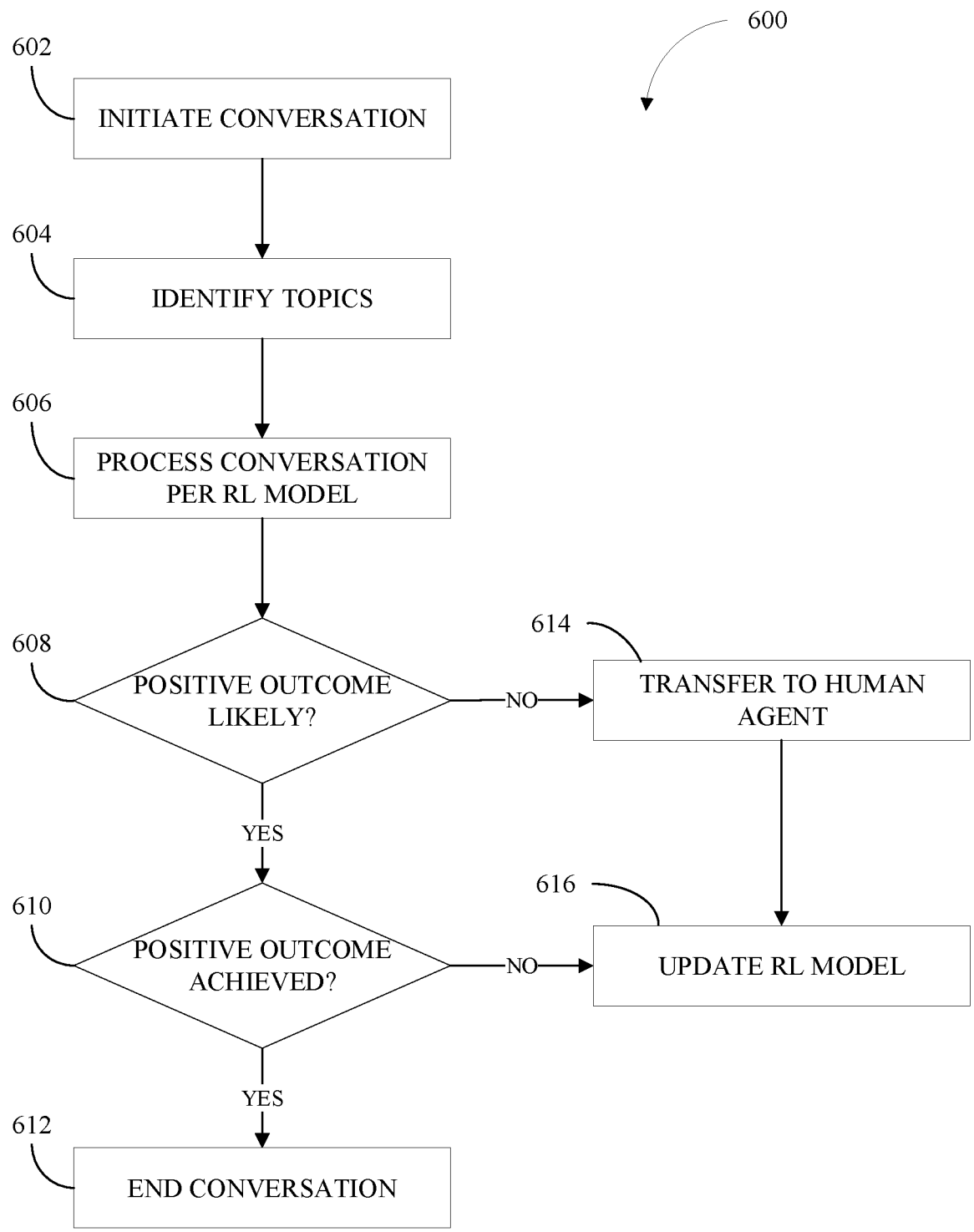
FIG. 6 illustrates a flow chart of an example method to deploy and update a reinforced learning model, in accordance with some embodiments of the present disclosure.

FIG. 5 and FIG. 6 depict flowcharts of example methods, method 500 and method 600, for generating and deploying RL model that can be performed in a computing environment (e.g., computing environment 400 and/or host 410). One or more of the advantages and improvements described above for generating and implement RL models may be realized by the method 500 and/or method 600, consistent with various embodiments of the present disclosure.

Method 500 can be implemented by one or more processors, feedback discriminator trainer 130, host 410, chatbot 420, and/or a different combination of hardware and/or software. In various embodiments, the various operations of method 500 are performed by one or more of host 410, chatbot 420, and/or model generator 430. For illustrative purposes, the method 500 will be described as being performed by model generator 430.

At operation 502, model generator 430 selects a conversation to analyze. In some embodiments, the selected conversation is included in a corpus of conversations. In some embodiments, the conversation is stored in conversation data 438. In some embodiments, the conversation is received from conversation repository 426. In various embodiments, various methods are used to select the conversation. The conversation selection may be based on when the conversation occurred, and/or may be based on one or more topics. The conversation may also be selected randomly. The selection may be based on similarity/differences from previously analyzed conversations, based on the agent (e.g., certain chatbot, specific human agents, etc.), geographic region, length, time received, user, and/or any other similar category.

At operation 504, model generator 430 identifies each turn in the selected conversation. The term may include a set of uninterrupted utterances by one party in the conversation. For example, one turn may include a chatbot asking "How are you today?", and another turn may include a user asking several questions before the agent responds. In some embodiments, each turn is labeled (e.g., turn 1, turn 2, . . . ).

At operation 506, model generator 430 associates one or more topics to each turn. In some embodiments, topics are general categories, such as greeting, salutation, problem, request, and other similar categories. In some embodiments, the topics are specific, such as reset password, make payment, close account, and other similar topics. The breadth and number of topics may be selected, updated, and or changed.

In some embodiments, the topics are associated to the turns based on information from the conversation. In some embodiments, NLP 412 is used to determine the topics. In some embodiments, the topics are related to the source of the communication. For example, if a user calls a "help line", then categories related to providing the user assistance may be selected. If a user calls a number from an advertisement, then the topic may be related to purchasing a product.

At operation 508, model generator 430 determines a conversation flow. The conversation flow may include all topics in the conversation, as well as the relative time in which they were addressed during the conversation. For example, assume a conversation has 50 turns and topics A, B, C, D, and E. An example flow may be turns 1-8, all topics discussed, turns 9-22 are related to Topic B, turns 23-33 are related to topic C, turns 33-48 are related to topic D, and 49-50 are related to topic E.

At operation 510, model generator 430 applies outcomes scores to the conversation flow. In some embodiments, there is an outcome score for the entire conversation. In some embodiments, there is an outcome score for each topic in the conversation. In some embodiments, there is an outcome score for each turn in the conversation.

In some embodiments, the score may be binary. In some embodiments, the outcome score may be selected from a range (e.g., 0 to 10, −10 to 10, etc.). Generally, the higher the score the better the outcome. In some embodiments, a topic or conversation score may be based on the scores for the parts of the conversation (e.g., conversation score based on topic scores). The score may be combined in any fashion (e.g., addition, multiplication, factors, etc.) to generate the overall (or topic) score.

In some embodiments, the scores are based on user feedback. The feedback may be received intermittently (e.g., selectable thumbs up and thumbs down in a chat window after agent turn) during the conversation or after the conversation.

In various embodiments, the scores are applied before and/or after the conversation is analyzed. In some embodiments, the scores are assigned by a SME. The SME may be a human agent conversing with the user. In some embodiments, the SME reviews the conversation flow and manually applies the scores.

At operation 512, model generator 430 determines if there are additional conversations to analyze. In some embodiments, all conversations are analyzed. In some embodiments, a subset of the conversations is analyzed. The subset may be based on a percentage of the total, the number received in a period of time, a set number (e.g., 100 conversations at a time), and/or other similar factors. If it is determined there are additional conversions to analyze (512: YES), then model generator 430 returns to operation 502. If it is determined there are no additional conversions to analyze (212: NO) then model generator 430 proceeds to operation 514.

At operation 514, model generator 430 generates RL model 434. In some embodiments, operation 514 includes generating a plurality of models. In some embodiments, the generated models are based on the results of operation 510. The model is configured to generate positive outcomes (or positive scores). The models may include a set of rules for making decisions based on the current factors. For example, assume chatbot 120 will decide when and how to move a conversation from topic B to topic C. That decision may be based on a topic B model, a topic C model, and/or an overall model. The decision may also be based on several analyzed conversations that performed a similar transition, and whether those transitions resulted in a positive outcome for the user.

At operation 516, model generator 430 deploy RL model 434. In some embodiments, RL model 434 is sent to chatbot 420 and incorporated as deployed model 424. Chatbot 420 may then use deployed model 424 to make decisions during subsequent conversations.

Method 600 can be implemented by one or more processors, model generator 430, host 410, and/or chatbot 420, and/or a different combination of hardware and/or software. In various embodiments, the various operations of method 600 are performed by one or more of host 410, chatbot 420, and model generator 430. For illustrative purposes, the method 600 will be described as being performed by chatbot 420.

At operation 602, chatbot 420 initiates a conversation with a user. In some embodiments, the conversation is in response to the user accessing the chatbot 420. For example, a user may call a telephone number, or select a chat option available on user device 440.

At operation 604 chatbot 420 identifies one or more topics for the conversation. In some embodiments, the topics are identified from user input. In some embodiments, the topics are identified by a context of initiation (e.g., link from advertisement, link from help icon etc.). In some embodiments, the topics are identified in response to a prompt. For example, chatbot may ask the user "How can I help you today?"

In some embodiments, operation 604 includes identifying one or more tasks to complete. The tasks may be related to the topics.

At operation 606, chatbot 420 proceeds through the conversation per deployed model 424. In some embodiments, the topic sequence is based on deployed model 424 and/or RL model 434. In some embodiments, the task to selected sequence is the sequence that has the highest probability of producing a positive overall outcome.

At operation 608, chatbot 420 determines if a positive outcome is likely. In some embodiments, a positive outcome is likely if the probability of a good outcome is above a threshold. The probability may be based on deployed model 424 and/or the associated Markov chain in the model. If it is determined a positive outcome is likely (608: YES), then chatbot 420 proceeds to operation 610. If it is determined a positive outcome is not likely (608: NO), then chatbot 420 proceeds to operation 614.

At operation 610, chatbot 420 determines if a positive outcome is achieved. In some embodiments, this determination is based on feedback from the user. In some embodiments, this determination is based on a SME applying a positive outcome score. In some embodiments, this determination is based on completing a specific task. For example, if one of the topics was purchase item, a positive outcome may be when the item is purchased, and a negative outcome if it is not purchased. If it is determined a positive outcome is achieved (610: YES), then chatbot 420 proceeds to operation 612. If it is determined a positive outcome is not achieved (610: NO), then chatbot 420 proceeds to operation 614. At operation 612, chatbot 420 ends the conversation.

At operation 614, chatbot 420 transfers the user to a human agent (or a different agent). This allows the agent to properly address the user while avoiding negative result.

At operation 616, chatbot 420 updates deployed model 424. In some embodiments, operation 616 includes storing the conversation in conversation repository 426. In some embodiments, operation 616 includes sending the new conversations to model generator 430 to be analyzed and receiving an updated RL model 434. The updates may determine why there was a low chance of a positive outcome and modify the model to prevent a similar situation. In some embodiments, the RL model 434 may be updated for any result achieved, with positive results representing a strengthening of that part of the model, and negative results representing a weakening of that part of the model.

Computer Technology and Computer Readable Media

The one or more embodiments disclosed herein accordingly provide an improvement to computer technology. For example, an improvement to a search engine allows for a more efficient and effective search for information by the user. The ability to access stored information with which the user has interacted with in some manner, and allowing the weighting of the importance of this information to decay over time beneficially improves the operation of the search and benefits the user in that more pertinent results may be presented to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, various embodiments have been discussed which are again specified in the following numbered examples:

Example 1 is as follows. A computer-implemented method comprising: selecting a plurality of conversations, wherein each conversation includes an agent and a user; identifying, in each of the plurality of conversations, a set of turns and one or more topics; associating the one or more topics to each turn of the set of turns; generating, based on the set of turns, a conversation flow for each conversation, wherein the conversation flow identifies a sequence of the one or more topics; applying an outcome score to each conversation; creating a reinforced learning (RL) model, wherein the RL model includes a Markov chain and wherein the RL model is based on the conversation flow of each conversation and the outcome score of each conversation; and deploying the RL model, wherein the deploying includes sending the RL model to a chatbot.

Example 2 is as follows. The method of example 1, further comprising: initiating, by the chatbot, a new conversation; developing, based on the RL model and based on a set of topics in the new conversation, a new conversation sequence; and completing, by the chatbot, one or more tasks, wherein the one or more tasks are based on the set of topics in the new conversation.

Example 3 is as follows. The method of examples 1 and/or 2, further comprising: determining, based on the RL model, that a probability of a positive outcome falls below a threshold; and transferring, in response to the probability falling below the threshold, the new conversation to a human agent.

Example 4 is as follows. The method of any of the preceding examples, further comprising: updating, in response to the probability falling below the threshold, the RL model, wherein the update alters the new conversation sequence and is configured to prevent the probability from falling below the threshold.

Example 5 is as follows. The method of any of the preceding examples, further comprising: completing the new conversation; determining, in response to completing the new conversation, that the new conversation includes a negative overall outcome; and updating, in response to the negative overall outcome, the RL model.

Example 6 is as follows. The method of any of the preceding examples, wherein the Markov chain includes a current state, two or more subsequent states, and a decision probability for each of the two or more states, wherein a summation of each decision probability equals one.

Example 7 is as follows. The method of any of the preceding examples, further comprising generating additional RL models for each of the one or more topics in the plurality of conversations.

Example 8 is as follows. The method of any of the preceding examples, wherein applying the outcome score to each conversation includes applying a topic outcome score for each of the one or more topics.

Example 9 is as follows. The method of any of the preceding examples, wherein applying the outcome score further includes incorporating a subject matter expert outcome score.

Example 10 is as follows. The method of any of the preceding examples, wherein the outcome score is based on feedback from the user.

Example 11 is as follows. The method of any of the preceding examples, wherein the method is performed by the agent, executing program instructions, and wherein the program instructions are downloaded from a remote data processing system.

Example 12 is as follows. A system comprising: a processor; and a computer-readable storage medium communicatively coupled to the processor and storing program instructions which, when executed by the processor, are configured to cause the processor to: select a plurality of conversations, wherein each conversation includes an agent and a user; identify, in each of the plurality of conversations, a set of turns and on or more topics; associate the one or more topics to each turn of the set of turns; generate, based on the set of turns, a conversation flow for each conversation, wherein the conversation flow identifies a sequence of the one or more topics; apply an outcome score to each conversation; create a reinforced learning (RL) model, wherein the RL model includes a Markov chain and wherein the RL model is based on the conversation flow of each conversation and the outcome score of each conversation; and deploy the RL model, wherein the deploying includes sending the RL model to a chatbot.

Example 13 is as follows. The system of example 12, wherein the program instructions are further configured to cause the processor to: initiate, by the chatbot, a new conversation; develop, based on the RL model and based on a set of topics in the new conversation, a new conversation sequence; and complete, by the chatbot, one or more tasks, wherein the one or more tasks are based on the set of topics in the new conversation.

Example 14 is as follows. The system of examples 12 and/or 13, wherein the program instructions are further configured to cause the processor to: generate additional RL models for each of the one or more topics in the plurality of conversations.

Example 15 is as follows. The system of any of the examples 12-14, wherein applying the outcome score to each conversation includes applying a topic outcome score for each of the one or more topics.

Example 16 is as follows. A computer program product, the computer program product comprising a computer readable storage medium having program instructions embodied therewith, the program instructions executable by a processing unit to cause the processing unit to: select a plurality of conversations, wherein each conversation includes an agent and a user; identify, in each of the plurality of conversations, a set of turns and on or more topics; associate the one or more topics to each turn of the set of turns; generate, based on the set of turns, a conversation flow for each conversation, wherein the conversation flow identifies a sequence of the one or more topics; apply an outcome score to each conversation; create a reinforced learning (RL) model, wherein the RL model includes a Markov chain and wherein the RL model is based on the conversation flow of each conversation and the outcome score of each conversation; and deploy the RL model, wherein the deploying includes sending the RL model to a chatbot.

Example 17 is as follows. The computer program product of example 16, wherein the program instructions are further configured to cause the processing unit to: initiate, by the chatbot, a new conversation; develop, based on the RL model and based on a set of topics in the new conversation, a new conversation sequence; and complete, by the chatbot, one or more tasks, wherein the one or more tasks are based on the set of topics in the new conversation.

Example 18 is as follows. The computer program product of examples 16 and/or 17, wherein the program instructions are further configured to cause the processing unit to: generating additional RL models for each of the one or more topics in the plurality of conversations.

Example 19 is as follows. The computer program product of any of the examples 16-18, wherein applying the outcome score to each conversation includes applying a topic outcome score for each of the one or more topics.

Example 20 is as follows. The computer program product of any of the examples 16-19, wherein the outcome score is applied by a subject matter expert.

What is claimed is:

1. A computer-implemented method comprising:
    selecting a plurality of conversations, wherein each conversation includes an agent and a user;
    identifying, in each of the plurality of conversations, a set of turns and one or more topics;
    associating the one or more topics to each turn of the set of turns;
    generating, based on the set of turns, a conversation flow for each conversation, wherein the conversation flow identifies a sequence of the one or more topics;
    applying an outcome score to each conversation;
    creating a reinforced learning (RL) model, wherein the RL model includes a Markov chain and wherein the RL model is based on the conversation flow of each conversation and the outcome score of each conversation; and
    deploying the RL model, wherein the deploying includes sending the RL model to a chatbot and the RL model is configured to maximize a future outcome score for a future conversation;
    initiating, in response to updating the RL model and by the chatbot, a new conversation;
    developing, based on the RL model and based on a set of topics in the new conversation, a new conversation sequence; and
    completing, by the chatbot, one or more tasks, wherein the one or more tasks are based on the set of topics in the new conversation.

2. The method of claim 1, further comprising:
    determining, based on the RL model, that a probability of a positive outcome falls below a threshold; and
    transferring, in response to the probability falling below the threshold, the new conversation to a human agent.

3. The method of claim 2, further comprising:
    updating, in response to the probability falling below the threshold, the RL model, wherein the update alters the new conversation sequence and is configured to prevent the probability from falling below the threshold.

4. The method of claim 1, further comprising:
    completing the new conversation;
    determining, in response to completing the new conversation, that the new conversation includes a negative overall outcome; and
    updating, in response to the negative overall outcome, the RL model.

5. The method of claim 1, wherein the Markov chain includes a current state, two or more subsequent states, and a decision probability for each of the two or more states, wherein a summation of each decision probability equals one.

6. The method of claim 1, further comprising:
    generating additional RL models for each of the one or more topics in the plurality of conversations.

7. The method of claim 6, wherein applying the outcome score to each conversation includes applying a topic outcome score for each of the one or more topics.

8. The method of claim 1, wherein applying the outcome score further includes incorporating a subject matter expert outcome score.

9. The method of claim 1, wherein the outcome score is based on feedback from the user.

10. The method of claim 1, wherein the method is performed by the agent, executing program instructions, and wherein the program instructions are downloaded from a remote data processing system.

11. A system comprising:
a processor; and
a computer-readable storage medium communicatively coupled to the processor and storing program instructions which, when executed by the processor, are configured to cause the processor to:
select a plurality of conversations, wherein each conversation includes an agent and a user;
identify, in each of the plurality of conversations, a set of turns and on or more topics;
associate the one or more topics to each turn of the set of turns;
generate, based on the set of turns, a conversation flow for each conversation, wherein the conversation flow identifies a sequence of the one or more topics;
apply an outcome score to each conversation;
create a reinforced learning (RL) model, wherein the RL model includes a Markov chain and wherein the RL model is based on the conversation flow of each conversation and the outcome score of each conversation;
deploy the RL model, wherein the deploying includes sending the RL model to a chatbot and the RL model is configured to maximize a future outcome score for a future conversation;
initiate, in response to updating the RL model and by the chatbot, a new conversation;
develop, based on the RL model and based on a set of topics in the new conversation, a new conversation sequence; and
complete, by the chatbot, one or more tasks, wherein the one or more tasks are based on the set of topics in the new conversation.

12. The system of claim 11, wherein the program instructions are further configured to cause the processor to:
generate additional RL models for each of the one or more topics in the plurality of conversations.

13. The system of claim 12, wherein applying the outcome score to each conversation includes applying a topic outcome score for each of the one or more topics.

14. A computer program product, the computer program product comprising a computer readable storage medium having program instructions embodied therewith, the program instructions executable by a processing unit to cause the processing unit to:
select a plurality of conversations, wherein each conversation includes an agent and a user;
identify, in each of the plurality of conversations, a set of turns and on or more topics;
associate the one or more topics to each turn of the set of turns;
generate, based on the set of turns, a conversation flow for each conversation, wherein the conversation flow identifies a sequence of the one or more topics;
apply an outcome score to each conversation;
create a reinforced learning (RL) model, wherein the RL model includes a Markov chain and wherein the RL model is based on the conversation flow of each conversation and the outcome score of each conversation;
deploy the RL model, wherein the deploying includes sending the RL model to a chatbot and the RL model is configured to maximize a future outcome score for a future conversation;
initiate, in response to updating the RL model and by the chatbot, a new conversation;
develop, based on the RL model and based on a set of topics in the new conversation, a new conversation sequence; and
complete, by the chatbot, one or more tasks, wherein the one or more tasks are based on the set of topics in the new conversation.

15. The computer program product of claim 14, wherein the program instructions are further configured to cause the processing unit to:
generating additional RL models for each of the one or more topics in the plurality of conversations.

16. The computer program product of claim 14, wherein applying the outcome score to each conversation includes applying a topic outcome score for each of the one or more topics.

17. The computer program product of claim 14, wherein the outcome score is applied by a subject matter expert.

* * * * *